March 6, 1928.

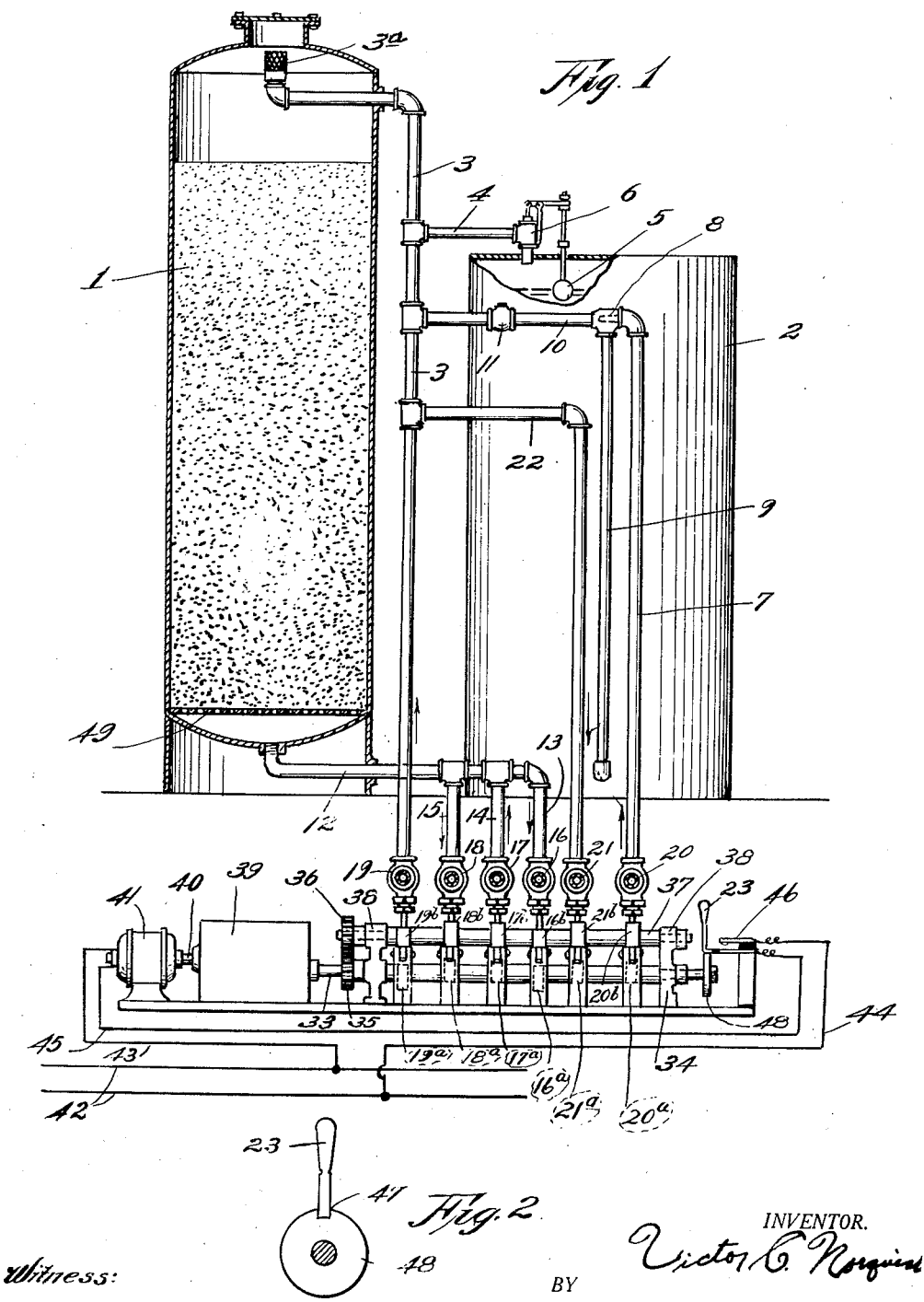

V. C. NORQUIST 1,661,676

WATER SOFTENING SYSTEM WITH SEMIAUTOMATIC REGENERATION

Filed April 26, 1926     2 Sheets-Sheet 2

Witness:
R. E. Hamilton

Victor C. Norquist INVENTOR.

BY

Thomas E. Scofield ATTORNEY

Patented Mar. 6, 1928.

1,661,676

UNITED STATES PATENT OFFICE.

VICTOR C. NORQUIST, OF KANSAS CITY, MISSOURI, ASSIGNOR TO BUTLER MANUFACTURING CO., OF KANSAS CITY, MISSOURI, A CORPORATION OF MISSOURI.

WATER-SOFTENING SYSTEM WITH SEMIAUTOMATIC REGENERATION.

Application filed April 26, 1926. Serial No. 104,636.

This invention relates to improvements in a water softening system with semi-automatic regeneration and refers more particularly to a water softening device which is a semi-automatic or one in which the regeneration of the material in the softener is performed automatically after the regenerating operation has been instituted or started by the manual operation of a lever or switch.

Among the objects of the invention are to provide a water softening device, comprising a tank or container in which is placed a material having an affinity for the objectionable lime and magnesia salts in the water, and has the ability of extracting these objectionable materials from the water by a chemical action in which certain ingredients of the softening material are replaced by said objectionable salts, and furthermore to provide a material which may be regenerated with a brine solution which re-establishes the softening material in its original state; to provide a water softening assembly consisting of a softening tank, a brine tank, and pipe connections in which are interposed valves automatically functioned and synchronized to terminate the service flow of water, regenerate the softener and put the system back in service by the simple manipulation of a manually operated switch or lever, and in general to provide a system or construction hereinafter more completely described.

Fig. 1 is a side elevational view of the apparatus.

Fig. 2 is a detail of the starting switch and starting cam arrangement.

Figure 3:
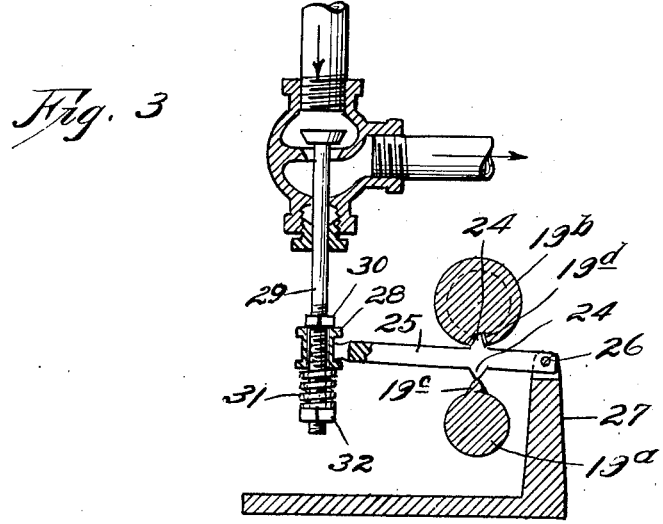
Fig. 3 is an enlarged detail of the mechanism operating the individual valves.

Referring to the drawings, at 1 is shown a tank or container, which is partially filled with a water softening material, such as zeolite, green sand, or other materials having the ability of extracting the objectionable salts from water which tend to produce hardness, and which is capable of being regenerated by the use of a salt brine. A brine tank is shown at 2 which is connected to the hard water supply pipe 3, terminating in the top of the tank 1 by a pipe 4, the latter pipe serving to supply water to the brine tank to an amount controlled by the float 5, functioning the valve 6. It is essential that the brine tank is sufficiently large to supply a brine solution to the softening material in the tank 1 during the regenerating operation adequate to completely regenerate the softening material. A second hard water supply pipe 7, terminating in an ejector 8, draws brine from the tank 2 through the brine suction pipe 9 and the mixture directed through the line 10, in which is interposed a check valve 11 to the hard water supply pipe 3 which serves also as a brine supply pipe during the regenerating period. From the bottom of the tank is a draw-off line 12 from which are taken secondary connections 13, 14 and 15. These secondary connections are controlled by valves 16, 17 and 18 respectively. The hard water supply pipe, or service line 3, is controlled by a valve 19 while the hard water supply pipe 7, used as a suction supply for the brine, is regulated by a valve 20. A valve 21 controls the back wash drain pipe 22, which is connected into the hard water pipe 3. This line 22 serves as a back wash drain when the softener is being back washed by an up flow of flush water supplied through the line 12 and secondary line 14 into the bottom of the tank 1, and withdrawn through the top of the tank through lines 3 and 21, the valve 19 being closed.

A hard water service line, not shown, is connected to the inlet side of the valve 20 for supplying water to the brine suction line 7, and to the valve 17 to introduce a water supply at the water main pressure to the back wash line 14, and finally to the inlet side of the valve 19 as a service supply of water to the system. The discharge from the line 15 through the valve 18 is connected to a soft water outlet line, not shown, through which soft water is supplied to the dwelling or for use in any connection. The discharge through the lines 13 and 21 and valves 16 and 22 are connected to sewer drains, not shown.

The regeneration of the system is effected by a mechanism which successively manipulates the valves 16 to 21 inclusive in timed relation. This timed relation consists in dividing the regeneration period into successive stages during which the softening material is salted or subjected to a brine treatment, flushed and back washed, and again put into service by the tripping of the lever 23, shown in Figs. 1 and 2. The mechanism for manipulating each of the separate valves is identical so that a description of one will suffice for all. This mechanism is shown in the enlarged detail view Fig. 3.

For convenience the cams manipulating the valves will be numbered similarly to the valve, that is—cams 19$^a$ and 19$^b$ function valve 19; cams 18$^a$ and 18$^b$ function valve 18, etc.

The projection 19$^c$ on the cam 19$^a$ contacts the projection 24 upon the lever arm 25. Simultaneously with this the like projection 24 on the opposite side of the lever arm 25 drops into the notched portion 19$^d$ of the cam 19$^b$. The lever arm 25 is pivoted at 26 on the standard 27. The oppposite or free end of the lever arm 25 being enclosed between the ridges of a spool 28, screwed upon the threaded end of the valve stem 29. On one side of the spool is a holding nut 30 and on the opposite side a buffer spring 31, which is held in place by means of a nut 32. The function of the buffer spring is to take up any play in the mechanism when the valve is seated.

As suggested, each of the valves are controlled by a similar mechanism with the exception that the cams functioning the valves are cut differently, in order to time the opening and closing of the valves in the right order and for a proper interval of time in order that the proper sequence of regenerating operations will result.

Figure 4:
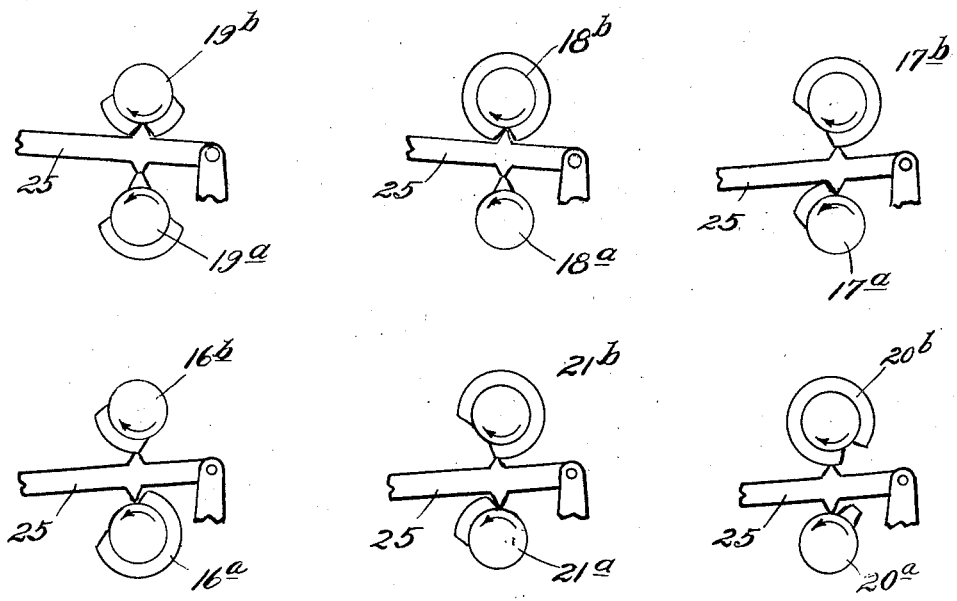
Fig. 4 is a diagrammatic showing of the position of the cams when the water softener is in service.

The cams 16$^a$ to 21$^a$ inclusive are mounted upon the driven shaft 33, supported by suitable journals 34. A spur gear 35 is also mounted upon the shaft 33 and meshes with a gear 36 mounted upon the upper cam shaft 37 which carries cams 16$^b$ to 21$^b$ inclusive. The shaft 37 is carried in suitable bearings, designated as 38. The gear box 39 contains a reduction drive consisting of a worm and worm wheel and suitable reduction gears adapted to reduce the speed of the motor shaft 40 to the extent that the driven shaft 33 will receive one complete revolution for the regenerating period of the softener. The motor 41 receives its power from any convenient source through the power lines 42 and secondary connections 43, 44 and 45. A contact switch mechanism 46 is shown in Fig. 1, and with the raising of the lever 23 the circuit is completed which starts the motor 41 and the regenerating mechanism in operation. This raising of the lever 23 removes a stop from the slot 47 in the starting cam 48, and with the starting of the motor and the rotation of the starting cam the lever 23 is held in a raised position and the circuit kept closed until one complete revolution of the starting cam. At the end of which time the starting lever stop again falls into the slot 47 in the starting cam, breaking the circuit and stopping the regenerating apparatus in service condition, or in position diagrammatically shown by the cams in Fig. 4.

Briefly the functioning of the mechanism is as follows: First, let us assume that the softener is in service with the hard water being supplied from the main through the valve 19, and line 3, into the top of the tank 1 through the screen terminal 3$^a$. The soft water is being withdrawn from the bottom of the softener through the line 15 and valve 18, the remaining valves in the system being closed. With our brine tank containing an adequate charge of brine solution the starting lever 23 is raised, closing the contact switch 46 and starting the motor 41, which immediately rotates the starting cam to a point where the stop on the lever is held on the outer periphery of the cam instead of in the slot. In this position the switch is kept closed and the motor continuously running until the cam has made a complete revolution and again dropped into the circuit breaking slot. The first stage of regeneration brought about by the rotation of the cam shafts is the closing of the valve 19 and the valve 18 and the opening of the valves 20 and valve 16, by their respective cams. Thus, the water admitted at the water main pressure through the line 7 by means of the ejector 8 draws the brine solution through the line 9 and charges it into the top of the softener. In the tank 1 the brine solution percolates down through the softening material, reacting with it to remove the objectionable lime salts which have accumulated during the service operation of the softener. The discharged material during this salting operation passes off through the line 12, and to the sewer through the flush drain pipe 13, and valve 16. When the softening material in the tank 1 has been treated with a brine solution for a period of time controlled to completely regenerate the said material, the cams function to close the valve 20 and open the valve 19. Thereafter for a predetermined period of time hard water is supplied through the line 3 to flush out the salt from the tank 1, the drain during this period being carried off through the pipe 12 and line 13 as before.

At the expiration of this period the valves 19 and 16 are closed and the valves 17 and 21 are opened, and during another interval, which is timed to produce an effective back wash of the regenerating substance, water is supplied from the hard water main through the valve 17, line 14 and line 12 into the bottom of the tank 1, and is drawn off through the line 3 at the top of the tank and into the back wash drain pipe 22, and discharged through the valve 21 into a sewer connection, not shown.

Finally the cams are rotated again to a service position where the valves 17 and 21 are closed and the valves 19 and 18 again opened. At the expiration of the back wash period the starting cam has made a complete revolution and simultaneously with this the cams have again arrived in a service position, shown in Fig. 4. At this juncture the stop of the starting lever 23 falls into the slot 47 breaking the circuit, and stopping the motor with the valves and line connections again in service position.

This method of regeneration is not altogether automatic, as the starting is a manual operation, and is wholly at the will of the operator. It differs in this regard to a mechanism which is functioned entirely automatic when the water has reached a certain degree of hardness. The regeneration with this device can be made at night when there is no further use of the water supply. Under such conditions it is only necessary to trip the starting lever and the water system will be again put back into service automatically at the expiration of the regenerating period.

This type of mechanism besides affording a system which eliminates the manual regeneration of the softener, permits the use of cheaper and less effective softening materials. The regeneration is such a simple operation with this system that the necessity of more frequent regeneration is not objectionable.

It is understood that the particular functioning of the valves by use of a double cam arrangement may be replaced with operating mechanism functioning somewhat differently without departing from the spirit or scope of the invention.

In the bottom of the tank is positioned a perforated plate or screen 49 for supporting the filter bed of softening material therein.

The particular sequence of the regenerating stages may be varied by backwashing as an initial instead of a final stage by rearrangement of the cam mechanism.

I claim as my invention:

1. A control for water softening systems having intermittent stages of supply and regeneration including a single softening container, supply, brine, service and drain connections, separate valves interposed in said connections, a plurality of oppositely positioned cam mechanisms mounted on coacting shafts and optionally operated by a single power source adapted to synchronously manipulate said valves to determine the regenerative and service stages.

2. Circulation controlling means for water softeners comprising a plurality of conduits, a valve in each conduit, an actuating lever for each valve, a plurality of pairs of opposed cams in spaced relation for operating the valve levers, and a single positive mechanical means for operating the cams.

3. Circulation controlling means for water softeners comprising a plurality of conduits, a valve in each conduit, an actuating lever for each valve, a plurality of pairs of opposed cams in spaced relation for operating the valve levers, and a unitary mounting for the cams.

4. Circulation controlling means for water softeners comprising a plurality of conduits, a valve in each conduit, an actuating lever for each valve, a plurality of pairs of opposed cams in spaced relation for operating the valve levers, a unitary mounting for the cams, and a single positive mechanical means for operating the cams.

5. Circulation controlling means for water softeners comprising a plurality of conduits, a valve in each conduit, an actuating lever for each valve, opposed cams operatively associated with each valve, and a single means for operating the cams.

6. Circulation controlling means for water softeners comprising a plurality of conduits, a valve in each conduit, an actuating lever for each valve, opposed cams operatively associated with each valve, and a single driven means for operating the cams.

7. Circulation controlling means for water softeners comprising a plurality of conduits, a value in each conduit, an actuating lever for each valve, opposed cams operatively associated with each valve, a single driven means for operating the cams, and an automatically operable means to determine the rotation of the cams.

8. A circulation controlling means comprising a plurality of supply and drain conduits, a valve in each conduit having a stem, a pivoted member associated with the stem, and a plurality of opposed cams associated with the pivoted member adapted to operate the valve.

9. A circulation controlling means comprising a plurality of supply and drain conduits, a valve in each conduit having a stem, a pivoted member associated with the stem, and a plurality of opposed cams on each side of the pivoted member adapted to operate the valve.

VICTOR C. NORQUIST.